(12) United States Patent
Mogi et al.

(10) Patent No.: US 11,981,371 B2
(45) Date of Patent: May 14, 2024

(54) FRONT STRUCTURE OF VEHICLE

(71) Applicant: Mazda Motor Corporation, Hiroshima (JP)

(72) Inventors: Hosei Mogi, Hiroshima (JP); Michiaki Sasaki, Hiroshima (JP)

(73) Assignee: MAZDA MOTOR CORPORATION, Hiroshima (JP)

( * ) Notice: Subject to any disclaimer, the term of this patent is extended or adjusted under 35 U.S.C. 154(b) by 302 days.

(21) Appl. No.: 17/706,601

(22) Filed: Mar. 29, 2022

(65) Prior Publication Data
US 2022/0315124 A1 Oct. 6, 2022

(30) Foreign Application Priority Data
Apr. 5, 2021 (JP) ................................. 2021-064052

(51) Int. Cl.
*B62D 25/08* (2006.01)
*B62D 25/24* (2006.01)

(52) U.S. Cl.
CPC ........... *B62D 25/081* (2013.01); *B62D 25/24* (2013.01)

(58) Field of Classification Search
CPC ..... B62D 35/081; B62D 25/24; B62D 25/082
See application file for complete search history.

(56) References Cited

U.S. PATENT DOCUMENTS

| | | | | |
|---|---|---|---|---|
| 4,078,840 A | * | 3/1978 | Itoh ...................... | B62D 25/081 296/192 |
| 9,914,340 B1 | * | 3/2018 | Bowers .................... | B60H 1/28 |
| 2010/0127535 A1 | * | 5/2010 | Barcelo ................ | B62D 25/081 296/208 |
| 2010/0187862 A1 | * | 7/2010 | Kurata .................... | B60R 13/07 296/192 |
| 2013/0088050 A1 | * | 4/2013 | Lacroix ................... | B60R 13/07 296/208 |
| 2016/0339962 A1 | | 11/2016 | Yamamoto | |
| 2020/0307711 A1 | * | 10/2020 | Ishiyama ............. | B62D 25/081 |
| 2022/0315123 A1 | * | 10/2022 | Mogi ................... | B62D 25/081 |

FOREIGN PATENT DOCUMENTS

| | | | | |
|---|---|---|---|---|
| EP | 3095679 A1 | * | 11/2016 | ........... B62D 25/081 |
| JP | 2016-215755 A | | 12/2016 | |
| JP | 2019081415 A | * | 5/2019 | |

* cited by examiner

*Primary Examiner* — Lori Lyjak
(74) *Attorney, Agent, or Firm* — XSENSUS LLP

(57) ABSTRACT

A front structure of a vehicle includes a drain provided below a cowl grille, the drain forming a closed cross-section extending in the vehicle width direction in cooperation with the cowl grille, and a gutter, provided in the closed cross-section above the drain, that receives the water dripping from a front windshield, in which the gutter member has a drain portion that drains the water to the drain, the drain has a top deck portion thereon at a position at which the drain overlaps with an outside air introduction hole in plan view, and the drain portion is provided at substantially the same position as the top deck portion in the vehicle width direction.

11 Claims, 13 Drawing Sheets

FRONT STRUCTURE OF VEHICLE

CROSS-REFERENCE TO RELATED APPLICATION

The present application claims priority to Japanese Patent Application 2021-064052, filed Apr. 5, 2021, the entire contents of which are incorporated herein by reference.

BACKGROUND

Field

The present disclosure relates to a front structure of a vehicle, and more particularly, to a front structure of a vehicle that includes a dash panel extending in the vehicle width direction and performs partitioning into an engine compartment and a vehicle interior in the vehicle front-rear direction, an air inlet provided on one end side in the vehicle width direction of the dash panel, and a cowl grille that has an outside air introduction hole at a position away from the air inlet toward the other end side in the vehicle width direction.

Description of the Related Art

There is a conventionally known structure in which a cowl center is provided as a gutter member that prevents the water dripping from a front windshield from entering the air inlet of a dash lower panel to cause the water to drip onto a drain member below the cowl center, and the water having dripped onto a drain member below the cowl center is drained to the outer side in the vehicle width direction (see patent document 1).

A closed cross-section extending in the vehicle width direction is generally formed between the cowl grille having an outside air introduction hole and the drain member. However, if the area of this closed cross-section is small, there is a concern that the flow rate of the air flowing in the closed cross-section increases, and the droplets of water dropped from the cowl center are entrained in the air with the high flow rate and enter the air inlet described above, causing a malfunction in an air conditioner.

PRIOR ART DOCUMENTS

Patent Documents

[Patent document 1] JP-A-2016-215755

SUMMARY

Technical Problems

Accordingly, an object of the present disclosure is to provide a front structure of a vehicle that can suppress the generation of droplets of the water dripping from a gutter member, and even if droplets are generated, can suppress the movement of the droplets along with an air flow in a closed cross-section.

Means for Solving the Problems

A front structure of a vehicle according to the present disclosure includes a dash panel that extends in a vehicle width direction and performs partitioning into an engine compartment and a vehicle interior in a vehicle front-rear direction; an air inlet provided on one end side in the vehicle width direction of the dash panel; a cowl grille that has an outside air introduction hole at a position away from the air inlet toward the other end side in the vehicle width direction; a drain member provided below the cowl grille, the drain member forming a closed cross-section extending in the vehicle width direction in cooperation with the cowl grille; and a gutter member provided in the closed cross-section above the drain member, the gutter member receiving water dripping from a front windshield, in which the gutter member has a drain portion that drains the water to the drain member, the drain member has a top deck portion thereon at a position at which the drain member overlaps with the outside air introduction hole in plan view, and the drain portion is provided at substantially the same position as the top deck portion in the vehicle width direction.

The top deck portion described above has a surface along the vehicle width direction at the highest position of the drain member.

According to the structure described above, the drain portion of the gutter member is vertically close to the top deck portion of the drain member and water is drained from the drain portion of the gutter member to the top deck portion of the drain member that is vertically close to the drain portion of the gutter member, so droplets are not easily generated.

In addition, the drain portion of the gutter member is away from the air inlet of the dash panel in the vehicle width direction, even if droplets are generated, the droplets can be prevented from being entrained in the air flowing in the closed cross-section.

Furthermore, the drain portion of the gutter member and the top deck portion of the drain member are present at positions at which these portions overlap with the outside air introduction hole in vehicle plan view, the pressure in the closed cross-section in the formation region of the outside air introduction hole is the same as that of the outside air, and the flow rate of air is the slowest in the closed cross-section. Since the water is drained to the top deck portion where the pressure is the same as that of the outdoor air and the flow rate of air is low as described above, even if droplets are generated, the droplets can be further prevented from being entrained in an air flow in the closed cross-section.

In short, the structure described above can suppress the generation of droplets of the water dripping from the gutter member and, even if droplets are generated, can suppress the movement of the droplets along with an air flow in the closed cross-section.

According to an embodiment of the present disclosure, the drain portion of the gutter member is provided in a middle portion in the vehicle width direction or a portion on the other end side in the vehicle width direction of the middle portion in the vehicle width direction.

In the structure described above, since the distance in the vehicle width direction between the air inlet of the dash panel and the drain portion can be ensured, even if droplets are generated, the droplets can be prevented from being entrained in an air flow in the closed cross-section.

According to an embodiment of the present disclosure, the drain member extends in the vehicle width direction and has an inclined portion inclined downward toward an outer side in the vehicle width direction on a longitudinal side of the drain member.

In the structure described above, since the inclined portion of the drain member is inclined downward toward the outer side and the drain route on the upper surface of the inclined portion is disposed downward toward the air inlet of the dash panel, the entrainment of droplets can be further suppressed.

According to an embodiment of the present disclosure, the drain member has a drain duct in an end portion on an outer side in the vehicle width direction of the inclined portion.

In the structure described above, since the flow path can be ensured by the drain duct described above, the generation of droplets can be reliably suppressed.

According to an embodiment of the present disclosure, the outside air introduction hole is formed in a middle portion in the vehicle width direction of the cowl grille or a portion on the other end side in the vehicle width direction of the middle portion in the vehicle width direction.

In the structure described above, the distance in the vehicle width direction between the air inlet of the dash panel and the outside air introduction hole of the cowl grille is securely ensured and the entrainment of droplets is effectively suppressed.

According to an embodiment of the present disclosure, the drain member corresponding to the drain portion of the gutter member is provided with a slope-shaped portion inclined from a rear portion to a front portion.

In the structure described above, the water dripping onto the slope-shaped portion of the drain member from drain portion of the gutter member flows down from the rear portion to the front portion along the slope-shaped portion.

According to an embodiment of the present disclosure, a plurality of ribs extending in the vehicle front-rear direction are spaced apart from each other in the vehicle width direction in the slope-shaped portion.

In the structure described above, the plurality of ribs described above can weaken the momentum of the air flowing in the closed cross-section, thereby increasing the effect of suppressing the entrainment of droplets.

Advantages

The present disclosure has the effect of suppressing the generation of droplets of the water dripping from the gutter member and, even if droplets are generated, suppressing the movement of the droplets along with an air flow in the closed cross-section.

DESCRIPTION OF EMBODIMENTS

An object of suppressing the generation of droplets of the water dripping from the gutter member and, even if droplets are generated, suppressing the movement of the droplets along with an air flow in the closed cross-section is achieved by the structure that includes a dash panel that extends in a vehicle width direction and performs partitioning into an engine compartment and a vehicle interior in a vehicle front-rear direction; an air inlet provided on one end side in the vehicle width direction of the dash panel; a cowl grille that has an outside air introduction hole at a position away from the air inlet toward the other end side in the vehicle width direction; a drain member provided below the cowl grille, the drain member forming a closed cross-section extending in the vehicle width direction in cooperation with the cowl grille; and a gutter member provided in the closed cross-section above the drain member, the gutter member receiving water dripping from a front windshield, in which the gutter member has a drain portion that drains the water to the drain member, the drain member has a top deck portion thereon at a position at which the drain member overlaps with the outside air introduction hole in plan view, and the drain portion is provided at substantially the same position as the top deck portion in the vehicle width direction.

Example

One example of the present disclosure will be described in detail below with reference to the drawings.

Figure 1:
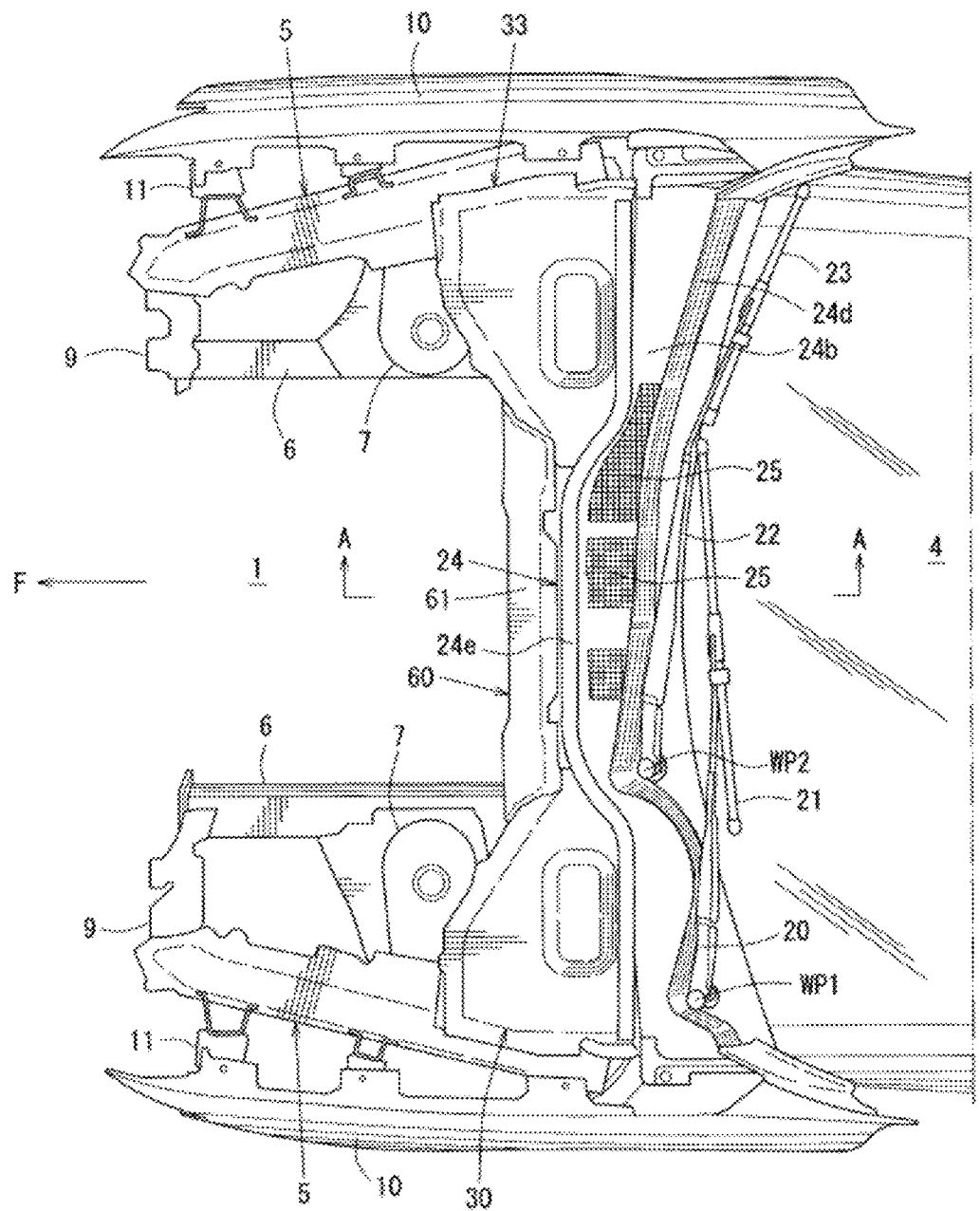
FIG. 1 is a plan view of a vehicle front portion having a front structure of a vehicle according to the present disclosure.
Figure 2:
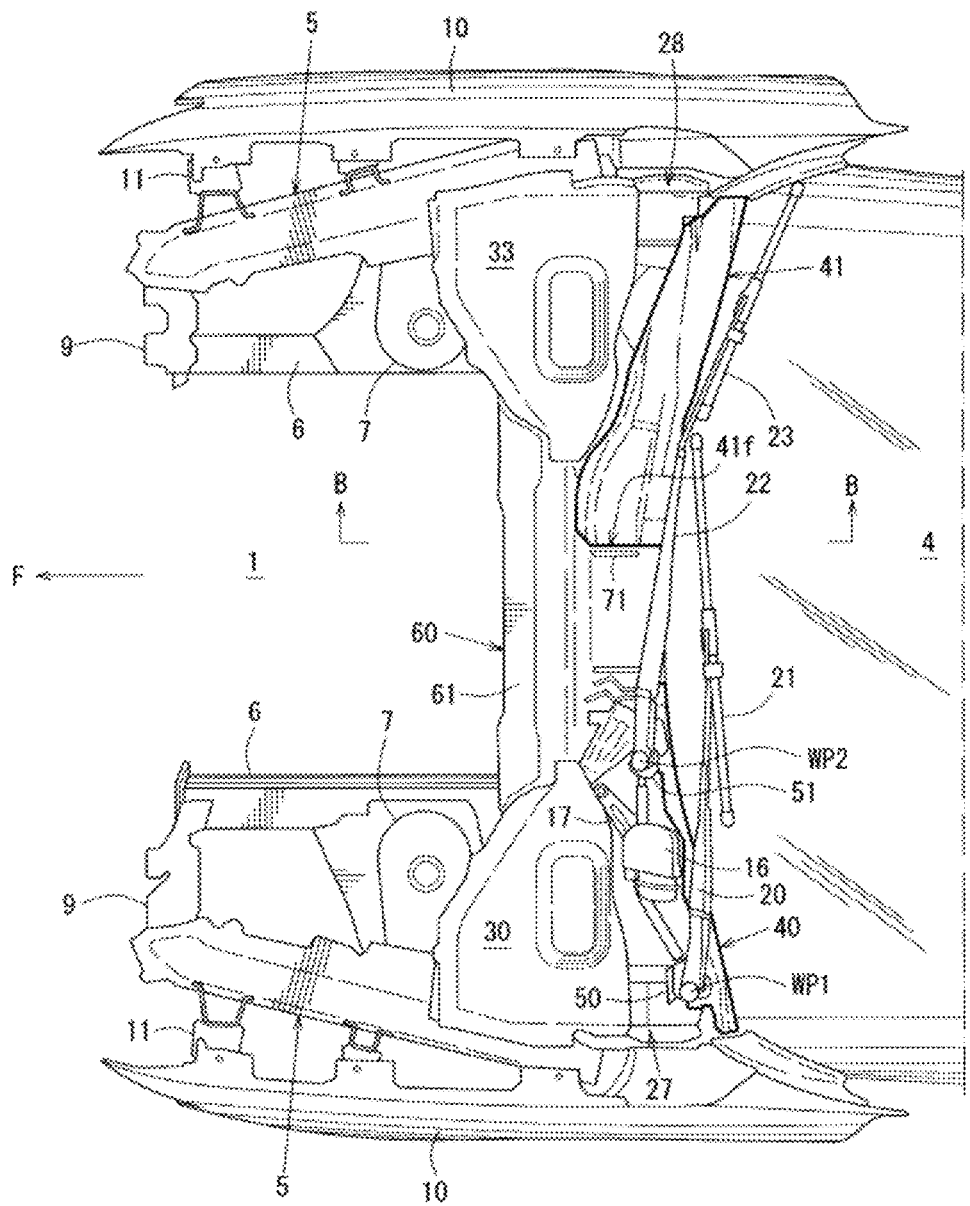
FIG. 2 is a plan view of the vehicle front portion in which a cowl grille has been removed from FIG. 1.
Figure 3:
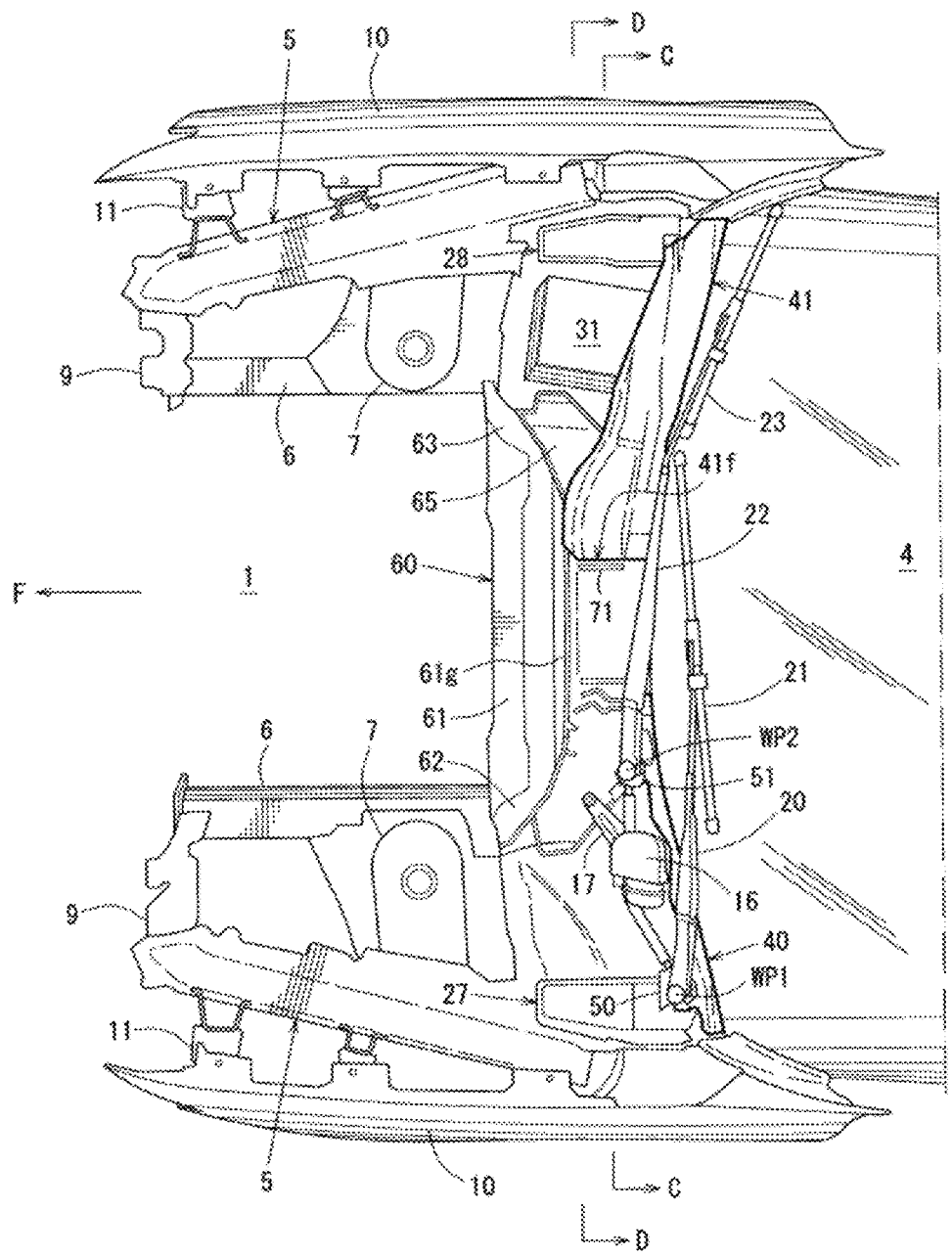
FIG. 3 is a plan view of the vehicle front portion in which a cover member has been removed from FIG. 2.

The drawings illustrate the front structure of a vehicle, FIG. 1 is a plan view of the vehicle front portion having the front structure of the vehicle, FIG. 2 is a plan view of the vehicle front portion in which the cowl grille has been removed from FIG. 1, and FIG. 3 is a plan view of the vehicle front portion in which the cover member has been removed from FIG. 2.

Figure 4:
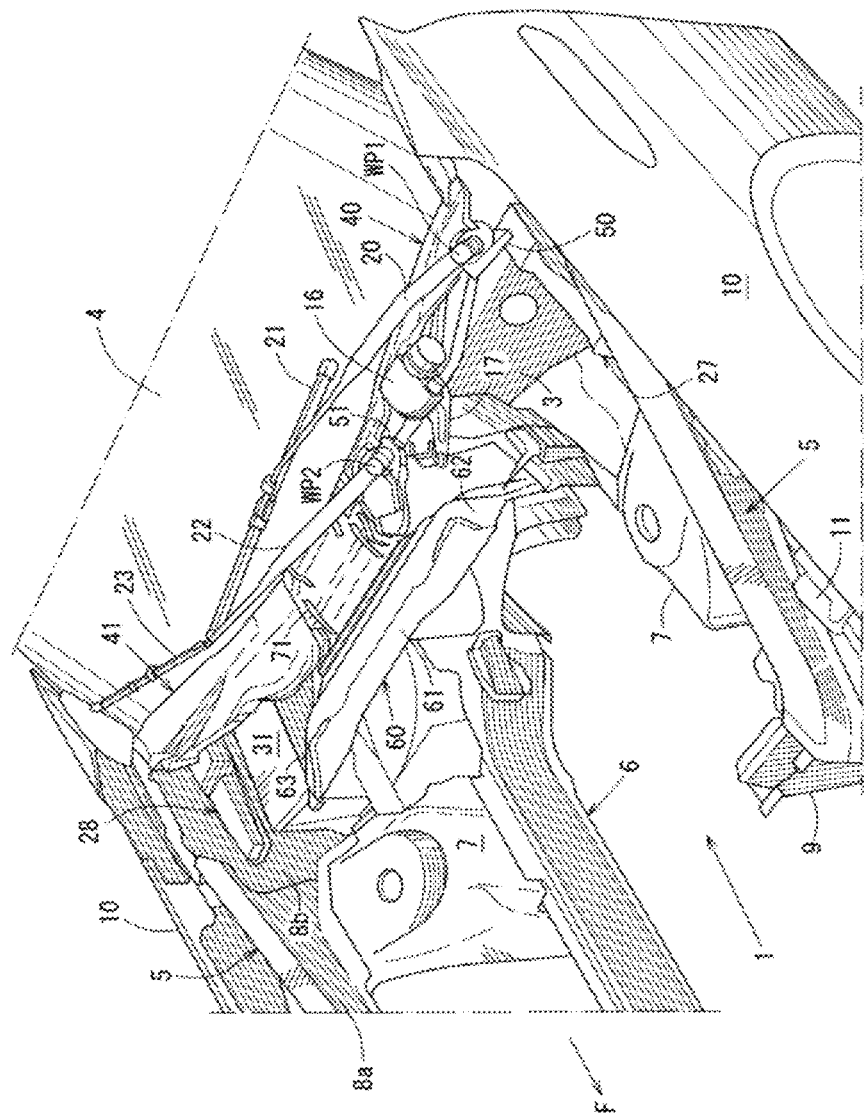
FIG. 4 is a perspective view of FIG. 3.
Figure 5:
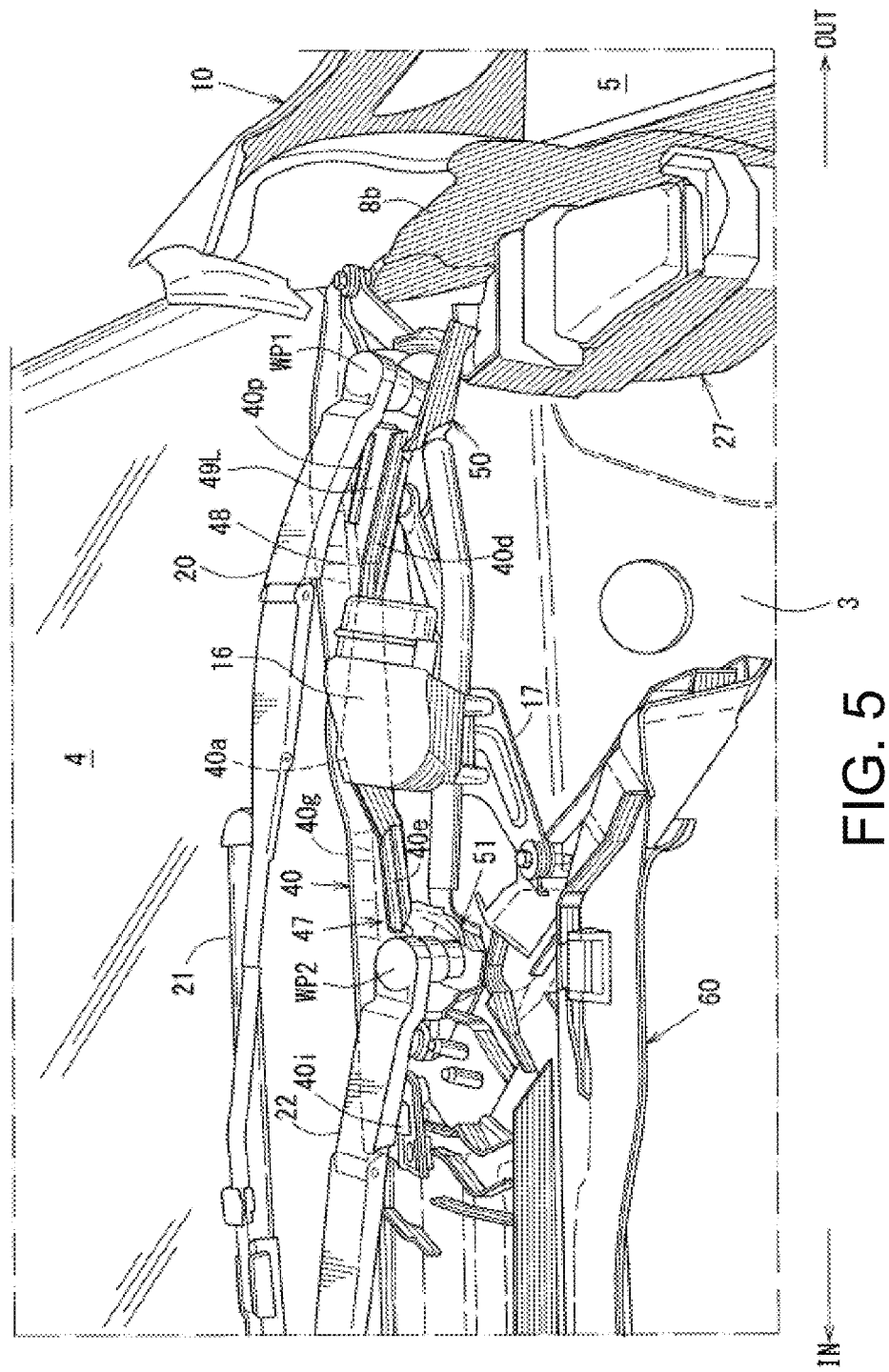
FIG. 5 is a front view illustrating a wiper motor and the surrounding structure thereof.
Figure 6:
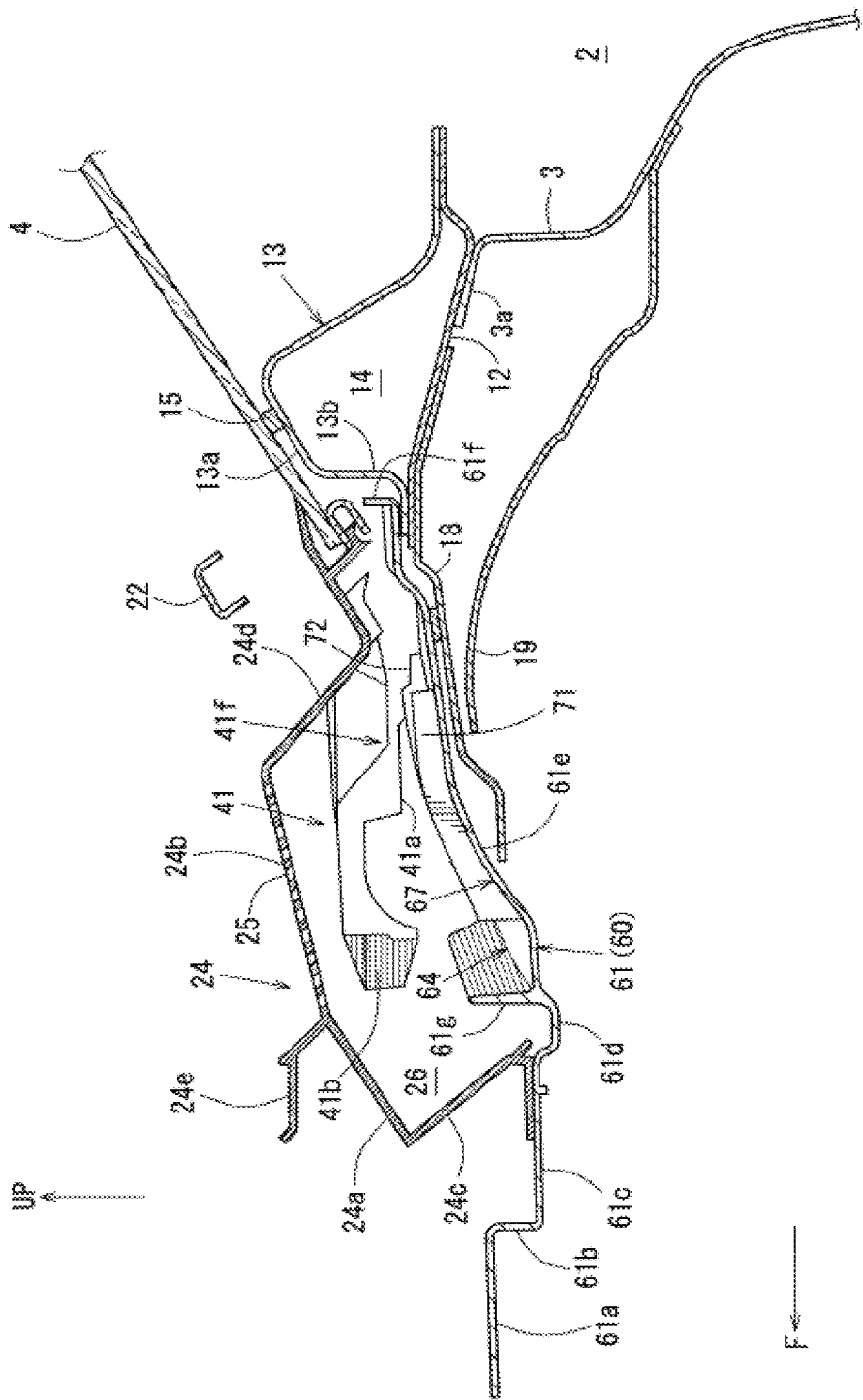
FIG. 6 is a sectional view seen along arrows A in FIG. 1.
Figure 7:
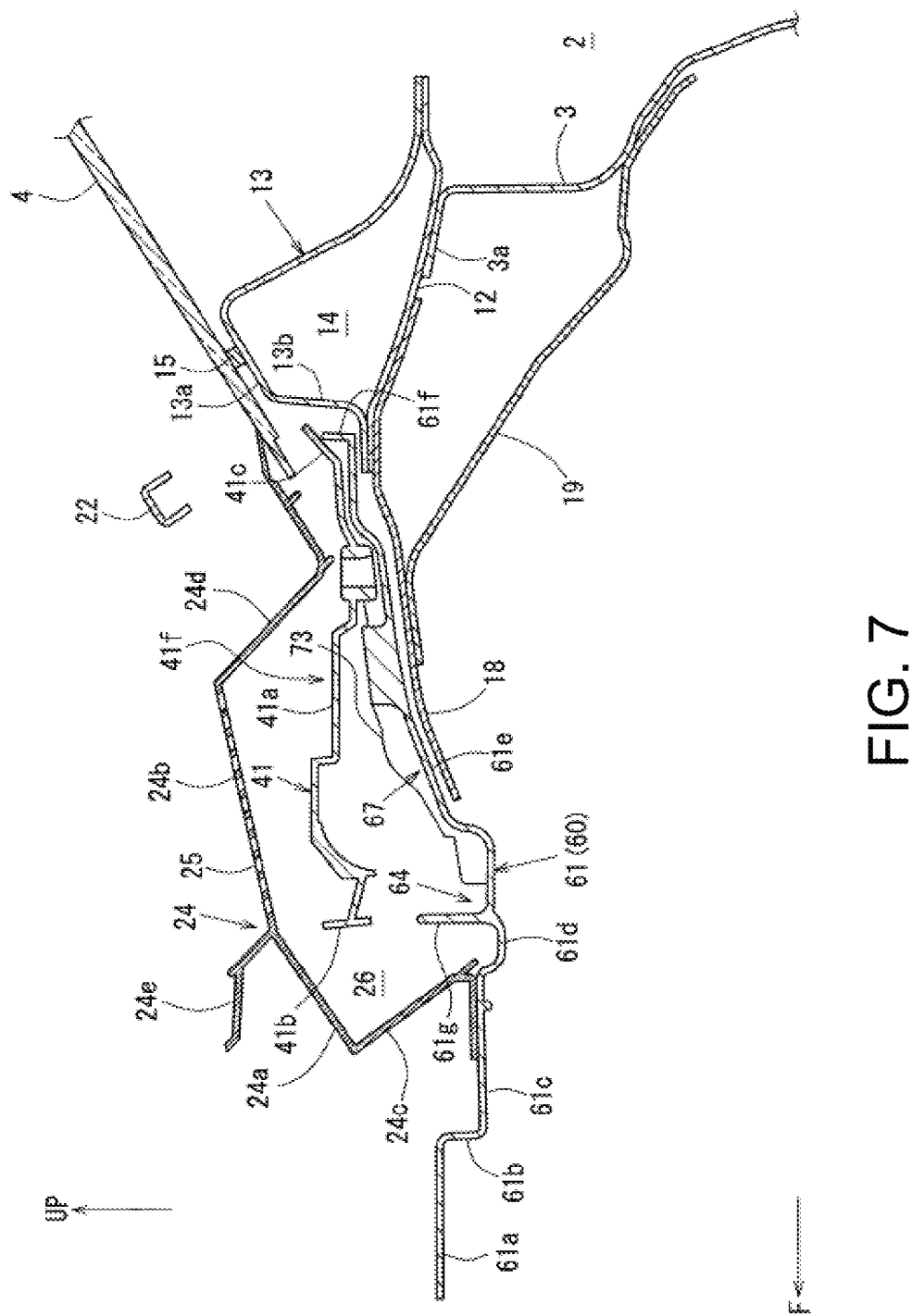
FIG. 7 is a sectional view seen along arrows B in FIG. 2.

In addition, FIG. 4 is a perspective view of FIG. 3, FIG. 5 is a front view illustrating a wiper motor and the surrounding structure thereof, FIG. 6 is a sectional view seen along arrows A in FIG. 1, and FIG. 7 is a sectional view seen along arrows B in FIG. 2.

Figure 8:
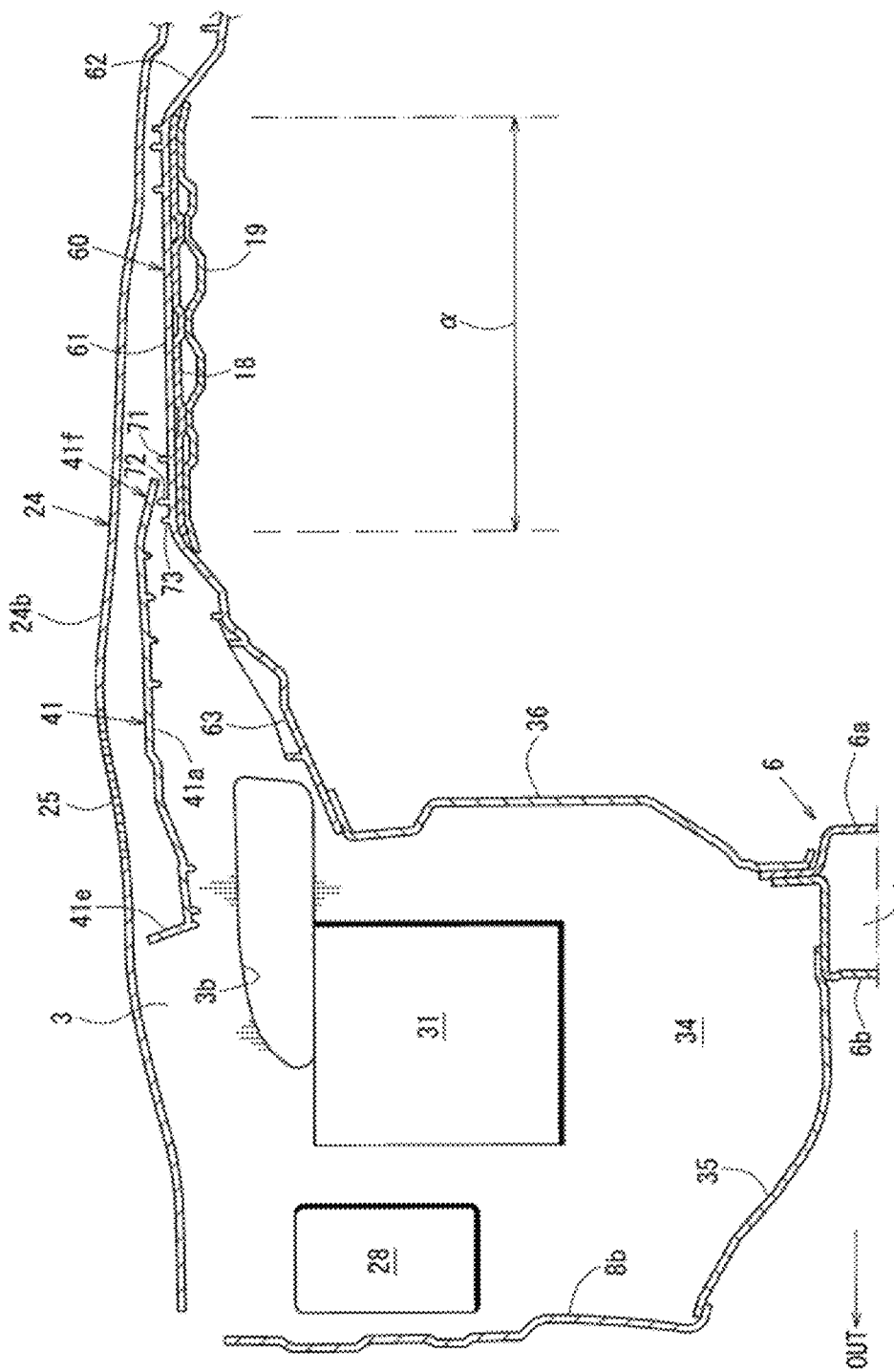
FIG. 8 is a sectional view of a half portion on a vehicle right side seen along arrows C in FIG. 3.
Figure 9:
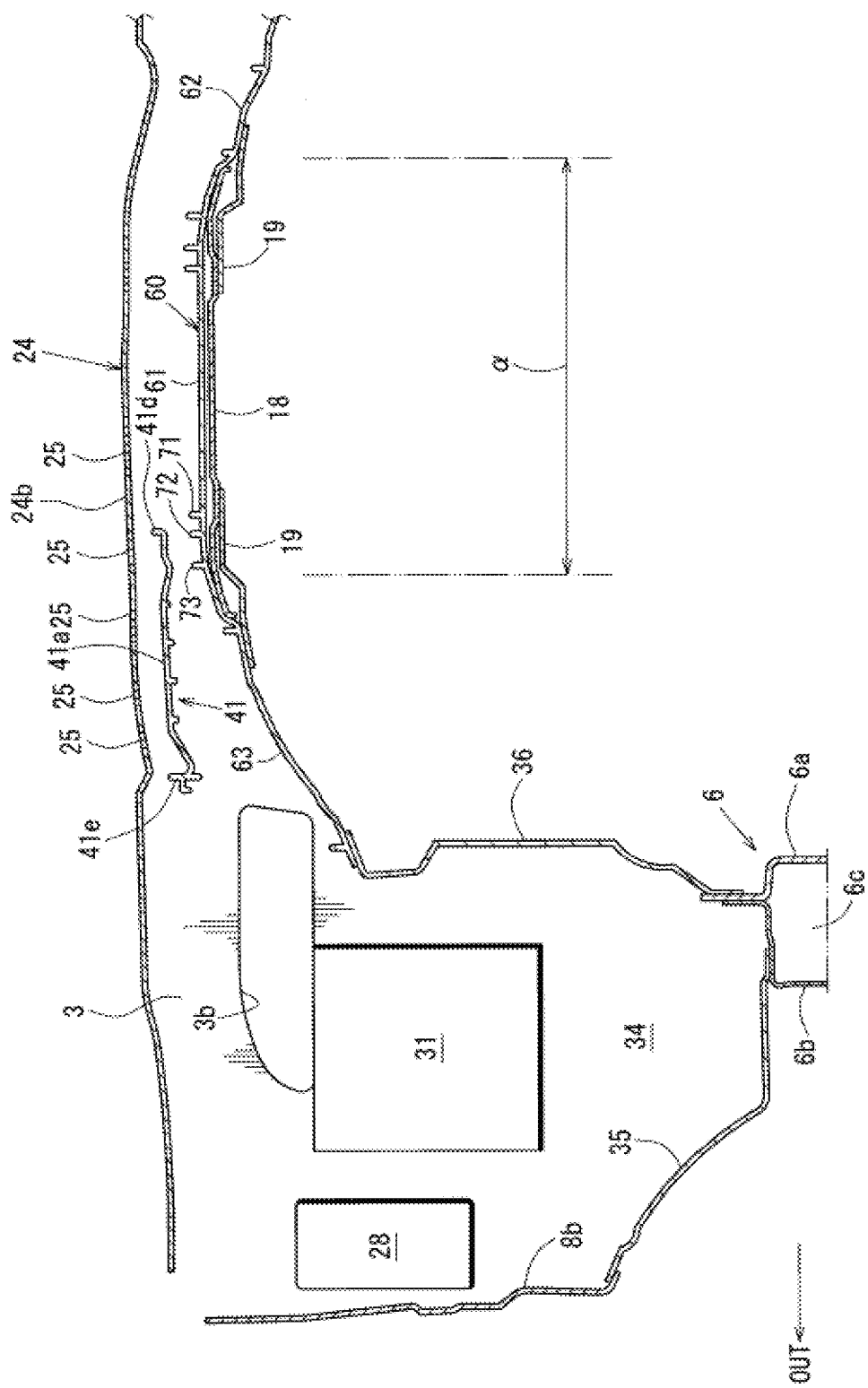
FIG. 9 is a sectional view of the half portion on the vehicle right side seen along arrows D in FIG. 3.

Furthermore, FIG. 8 is a sectional view of a half portion on a vehicle right side seen along arrows C in FIG. 3 and FIG. 9 is a sectional view of the half portion on the vehicle right side seen along arrows D in FIG. 3.

Before the front structure of a vehicle is described, a front body structure will be first described.

As illustrated in FIGS. 6 and 7, there is provided a dash lower panel 3 as a dash panel that separates an engine compartment 1 (see FIGS. 1 to 4) from a vehicle interior 2 in the vehicle front-rear direction. This dash lower panel 3 extends in the vehicle width direction and the left and right end portions in the vehicle width direction of the dash lower panel 3 are coupled to hinge pillars.

The hinge pillars described above are erected so as to extend in the vehicle vertical direction. Each of the hinge pillars is the vehicle body strengthening member that joins and fixes a hinge pillar inner and a hinge pillar outer to each other and has a hinge pillar closed cross-section extending in the vehicle vertical direction.

The lower end portion of the hinge pillar described above is provided with a side sill extending from the lower end portion to the vehicle rear. This side sill is the vehicle body strengthening member that joins and fixes a side sill inner and a side sill outer to each other and has a side sill closed cross-section extending in the vehicle front-rear direction.

In addition, the upper end portion of the hinge pillar described above is provided with a front pillar extending backward and diagonally upward from the upper end portion. This front pillar is the vehicle body strengthening member that joins and fixes a front pillar inner and a front pillar outer to each other and has a front pillar closed cross-section extending diagonally rear upward of the vehicle.

As illustrated in FIGS. 1 to 4, a front windshield 4 (so-called front window glass) is provided in an opening, which is surrounded and formed by a pair of left and right front pillars, a front header disposed on the front side of the upper portion of the vehicle, and a cowl panel 13 described later, in which the front windshield is disposed.

Here, the dash lower panel 3 described above is the panel member that is located in the lower end portion of the front windshield 4 and separates the engine compartment 1 from the vehicle interior 2 in the vehicle front-rear direction while extending in the vehicle width direction, as illustrated in FIG. 6.

On the other hand, as illustrated in FIGS. 1 to 4, a pair of left and right apron reinforcements 5 extending to the vehicle front from the front portions of the upper ends of the left and right hinge pillars described above are provided in front portions of the upper ends.

As illustrated in FIGS. 1 to 4, there is provided a pair of left and right front side frames 6 extending to the vehicle front from both ends in the vehicle width direction of the dash lower panel 3. The front side frames 6 are located on the inner side in the vehicle width direction and on the lower side in the vehicle vertical direction of the apron reinforcements 5 described above.

In addition, as illustrated in FIGS. 8 and 9, each of the front side frames 6 described above is the vehicle body strengthening member that joins and fixes a front side frame inner 6a and a front side frame outer 6b to each other and has a front side frame closed cross-section 6c extending in the vehicle front-rear direction.

As illustrated in FIGS. 1 to 4, there is provided suspension tower portions 7 that project upward while being fixed to the front side frames 6 described above and support the upper portions of the dampers of front suspension devices. As illustrated in FIG. 4, each of the suspension tower portions 7 is mounted across a front side panel 8a constituting the inner side surface of the apron reinforcement 5 and the front side frame 6 described above. Here, strut tower portions may be adopted as the suspension tower portions 7 described above.

Rear side panels 8b are provided so as to be continuous with the front side panels 8a described above in the vehicle front-rear direction (see FIG. 4).

As illustrated in FIGS. 1 to 4, there are provided coupling members 9 that couple the front end portions of the front side frames 6 and the front portions of the apron reinforcements 5 to each other in the vehicle vertical direction in the front end portion of the front side frames 6.

On the other hand, as illustrated in FIGS. 1 to 4, the left and right side portions in the vehicle width direction of the engine compartment 1 described above are covered with front fender panels 10. In addition, a bonnet covers the engine compartment 1 described above from above with in an openable and closable manner.

Here, as illustrated in FIGS. 1 to 3, the front fender panel 10 described above is fixed to the apron reinforcement 5 with a plurality of mounting members 11. In addition, the bonnet described above includes a bonnet outer panel and a bonnet inner panel and the bonnet outer panel is integrated with the bonnet inner panel by hemming the peripheral portion of the bonnet outer panel.

As illustrated in FIGS. 6 and 7, an upper end bent portion 3a is integrally formed at the upper end of the dash lower panel 3 described above, and an air inlet 3b (see FIGS. 8 and 9) that takes in air for air conditioning is opened and formed on one end side (the right end side in the vehicle width direction in this example) in the vehicle width direction.

As illustrated in FIGS. 6 and 7, an upper end bent portion 3a of the dash lower panel 3 described above is provided with the cowl panel 13 having a substantially hat-shaped cross-section via a dash upper panel 12. A cowl closed cross-section 14 extending in the vehicle width direction is formed between the cowl panel 13 and the dash upper panel 12 described above to improve the rigidity of the cowl portion.

As illustrated in FIGS. 6 and 7, the front windshield 4 described above is attached to an upper wall portion 13a, which is inclined in a front-low-back-high manner, of the cowl panel 13 described above via an adhesive 15.

As illustrated in FIGS. 2 to 5, the wiper motor 16 as the electrical component is provided below the left portion in the vehicle width direction of the front windshield 4 described above. This wiper motor 16 is supported by a wiper motor support bracket 17 illustrated in FIG. 5.

In addition, as illustrated in FIG. 5, the wiper motor 16 described above is disposed between a pair of wiper pivots WP1 and WP2 spaced apart from each other in the vehicle width direction.

As illustrated in FIGS. 1 to 4, a wiper blade 21 is attached to one wiper pivot WP1 located on the left end side in the vehicle width direction via a wiper arm 20 and a wiper blade 23 is attached to the other wiper pivot WP2 located on the inner side in the vehicle width direction of the wiper pivot WP1 via a wiper arm 22.

When the wiper motor 16 described above is driven, the left and right wiper blades 21 and 23 are driven simultaneously about the pair of the wiper pivot WP1 and WP2 as the fulcrums via the left and right wiper arms 20 and 22 to wipe out the front windshield 4.

As illustrated in FIG. 1, a cowl grille 24 located toward the vehicle front from the dash lower panel 3 is provided below (diagonally below the front windshield 4 in this example) the front windshield 4 and above the wiper motor 16.

As illustrated in FIG. 1, this cowl grille 24 extends across substantially the entire width in the vehicle width direction. In addition, as illustrated in FIGS. 6 and 7, this cowl grille 24 includes front and rear upper surface portions 24a and 24b, front and rear vertical wall portions 24c and 24d, and a cowl seal mount portion 24e on which a cowl seal is mounted.

Furthermore, as illustrated in FIG. 1, in an upper surface portion 24b behind the cowl grille 24 described above, an outside air introduction hole 25 having a mesh structure is opened and formed in a portion shifted to the right in the vehicle width direction from the middle portion in the vehicle width direction.

The outside air introduction hole 25 described above is formed at a position away from the air inlet 3b of the dash lower panel 3 toward the inner side in the vehicle width direction, which is the other end side in the vehicle width direction, as illustrated in FIGS. 8 and 9.

As illustrated in FIGS. 1 and 3, in front of the left portion in the vehicle width direction of the cowl grille 24, there is provided a cover member 30 (see FIG. 1) that covers, from above, a reservoir tank as one of the auxiliaries and a fuse box storage case 27 that houses a fuse box 26 as one of the auxiliaries.

In addition, as illustrated in FIGS. 1 and 3, in front of the right portion in the vehicle width direction of the cowl grille 24, there is provided a cover member 33 (see FIG. 1) that covers, from above, a battery 31 as one of the auxiliaries and a fuse box storage case 28 that houses the fuse box as one of the auxiliaries.

As illustrated in FIGS. 6 and 7, there is provided a drain member 60 that forms a closed cross-section 26 extending in the vehicle width direction in cooperation with the cowl grille 24 below the cowl grille 24.

As illustrated in FIGS. 2, 3, and 4, cowl centers 40 and 41 as left and right gutter members are provided spaced apart from each other in the middle portion in the vehicle width direction below the front windshield 4. These cowl centers 40 and 41 are the rain gutter members that receive the water dripping from the front windshield 4.

Both the left and right cowl centers 40 and 41 are disposed in the closed cross-section 26 between the cowl grille 24 and the drain member 60 (see FIGS. 6 and 7).

FIGS. 6 and 7 illustrate only the cowl center 40 on the vehicle right side, but the left and right cowl centers 40 and 41 are provided so as to extend from the front wall portion 13b of the cowl panel 13 to the vehicle front. The cowl center 40 on the vehicle left side is provided immediately behind the wiper motor 16 (electrical component) described above as illustrated in FIGS. 2 to 5.

In FIGS. 6 to 9, reference numeral 18 indicates a cowl reinforcement upper extending from the dash upper panel 12 to the vehicle front and reference numeral 19 indicates a cowl reinforcement lower extending from the upper portion of the dash lower panel 3 to the vehicle front.

Figure 10:
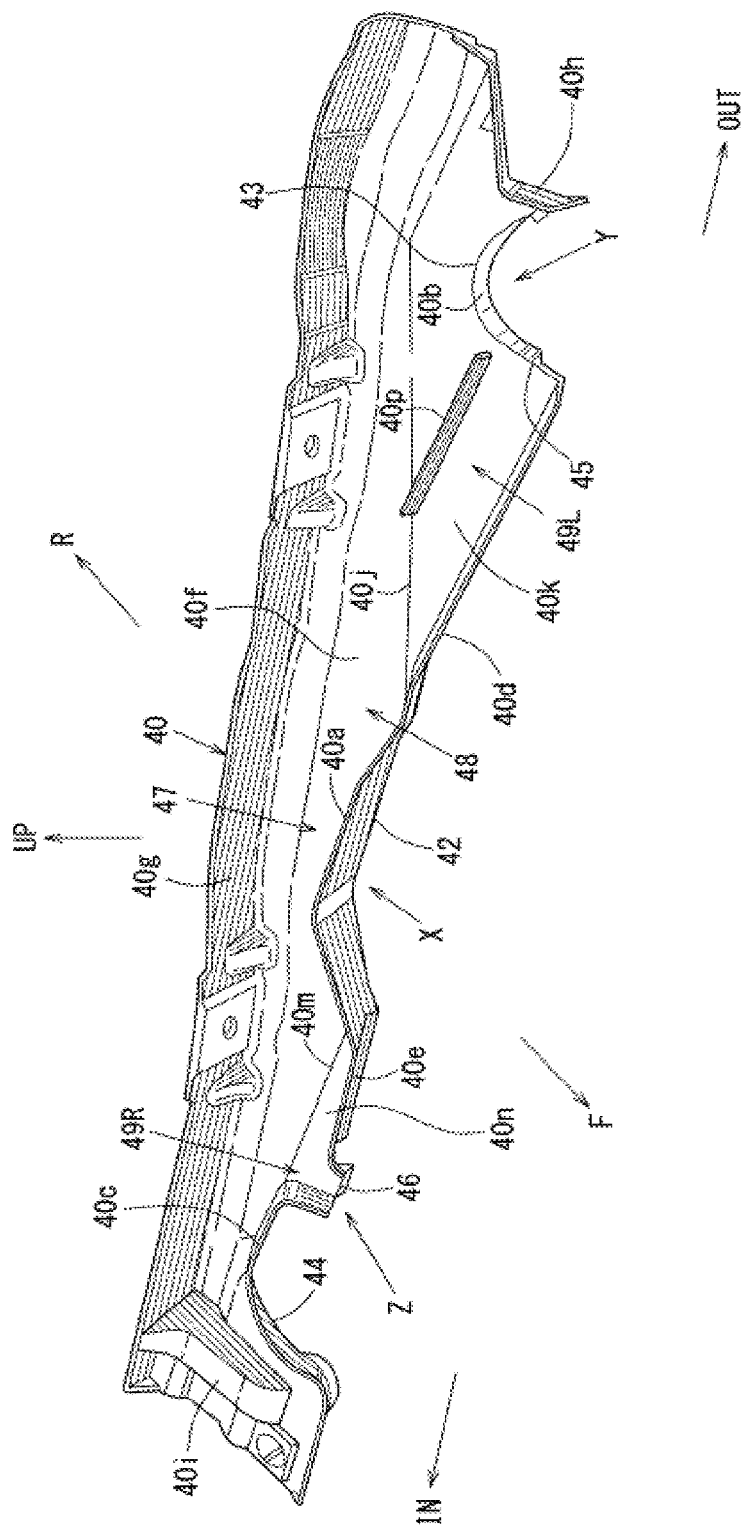
FIG. 10 is a perspective view of a cowl center provided on the vehicle left side.
Figure 11:
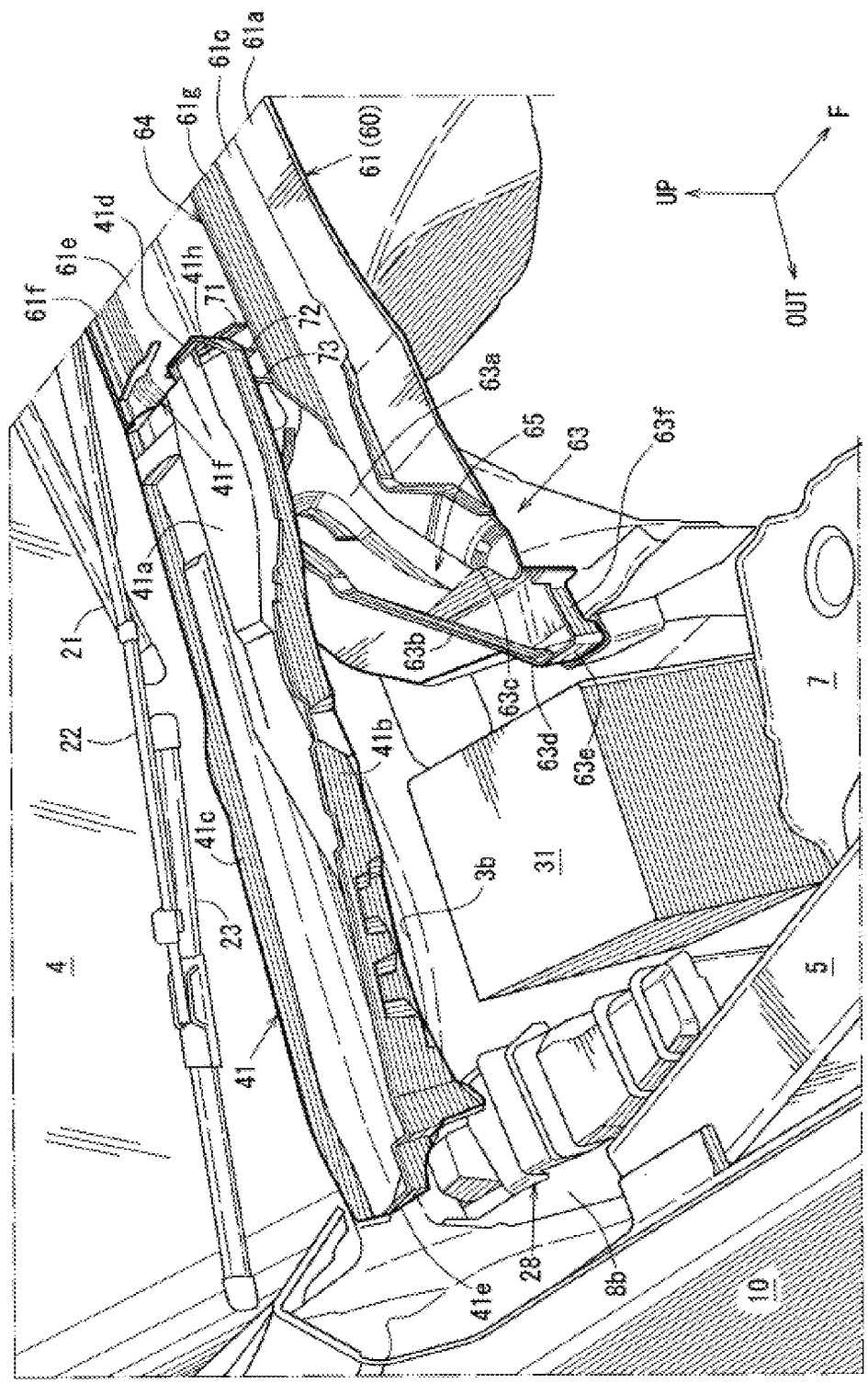
FIG. 11 is a perspective view of a main portion on the vehicle right side in FIG. 3.
Figure 12:
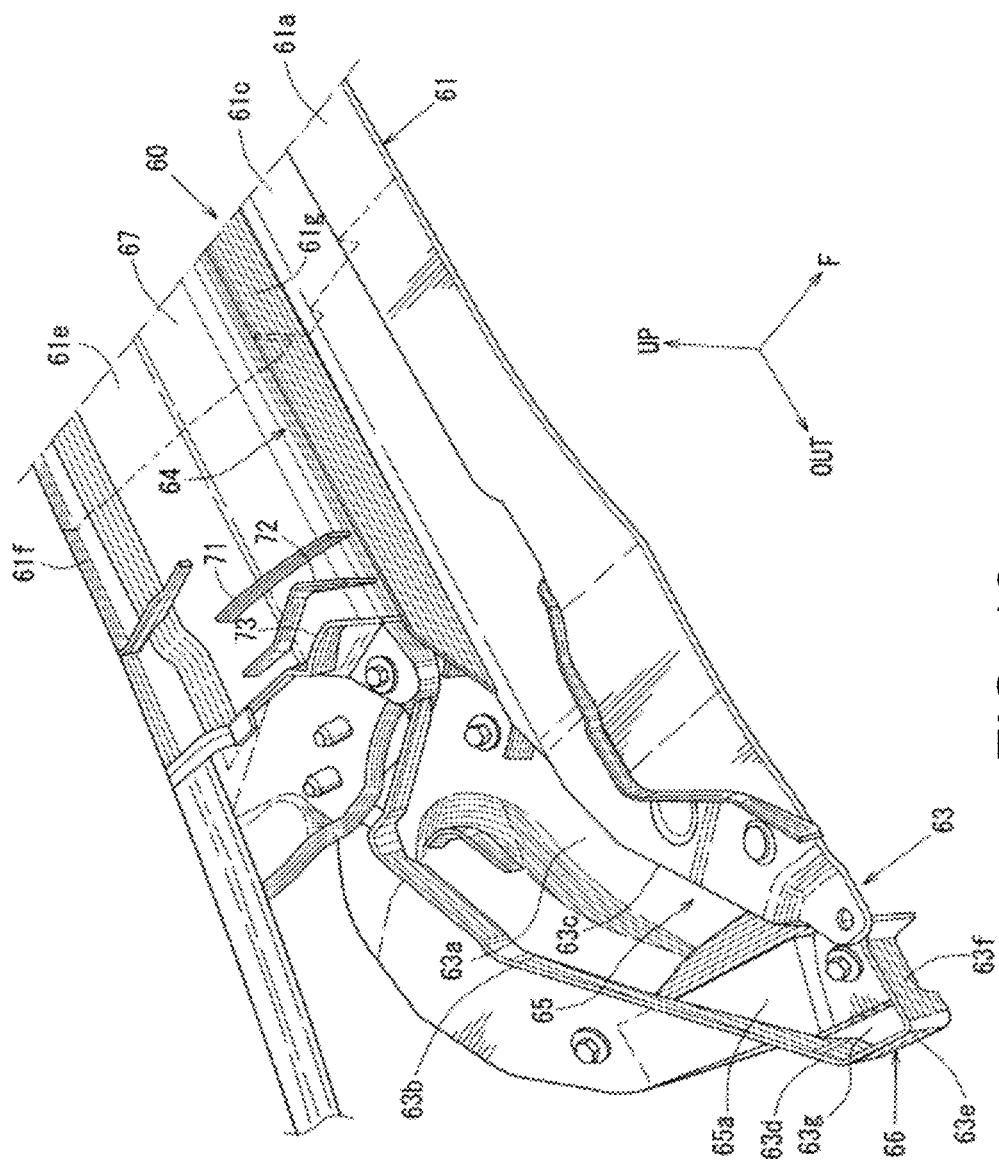
FIG. 12 is a perspective view of the main portion in which the cowl center has been removed from FIG. 11.
Figure 13:
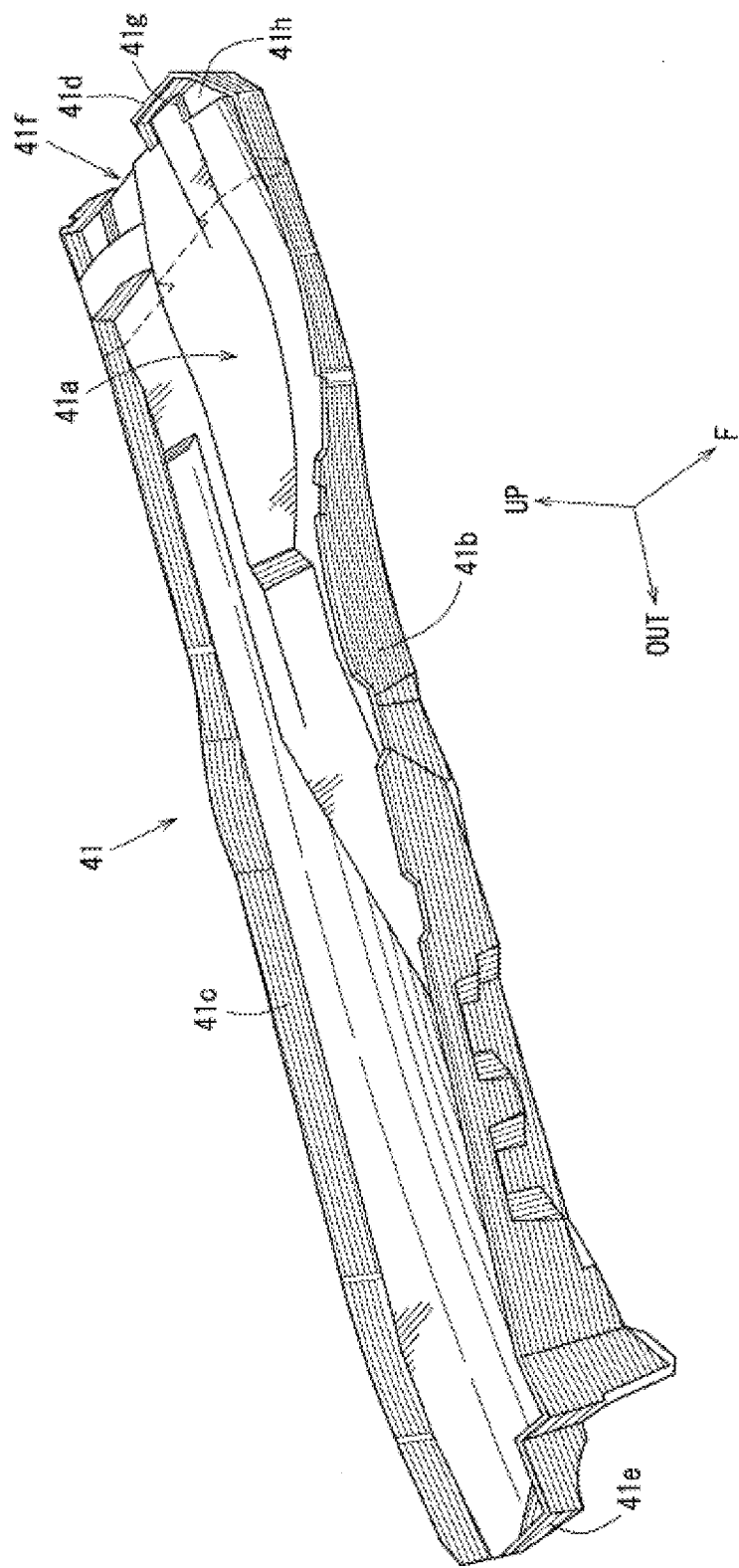
FIG. 13 is a perspective view illustrating only the cowl center on the vehicle right side in FIG. 11.

FIG. 10 is a perspective view of the cowl center 40 provided on the vehicle left side, FIG. 11 is a perspective view of the main portion on the vehicle right side in FIG. 3, FIG. 12 is a perspective view of the main portion in which the cowl center 41 has been removed from FIG. 11, and FIG. 13 is a perspective view illustrating only the cowl center 41 on the vehicle right side shown in FIG. 11.

As illustrated in FIGS. 5 and 10, the cowl center 40 described above disposed on the vehicle left side has a recess portion 42 recessed toward the vehicle rear in vehicle plan view at a position X at which the wiper motor 16 in front of the middle portion in the longitudinal direction thereof is provided and has a front wall 40a rising upward from the peripheral edge of the recess portion 42.

In addition, the cowl center 40 described above has a recess portion 43 recessed toward the vehicle rear in vehicle plan view at a position Y at which one wiper pivot WP1 in front of the outer portion in the vehicle width direction is provided and has a skirt portion 40b extending downward from the peripheral edge of the recess portion 43.

Furthermore, the cowl center 40 described above has a recess portion 44 recessed toward the vehicle rear in vehicle plan view at a position Z at which the other wiper pivot WP2 in front of the inner portion in the vehicle width direction thereof is provided and has a vertical wall 40c rising upward from the peripheral edge of this recess portion 44.

The recess portion 43 on the vehicle left side at the position Y is an outflow portion 45 for the dripped water drops.

An outflow portion 46 for dripped water drops is provided at the position Z adjacent to the left side in the vehicle width direction of the recess portion 44 on the vehicle right side.

In addition, a partition wall 40d rising upward is provided between the outer end in the vehicle width direction of the front wall 40a at the position X and the front portion of the inner end in the vehicle width direction of the recess portion 43 at the position Y.

Furthermore, a partition wall 40e rising upward is provided between the inner end in the vehicle width direction of the front wall 40a at the position X described above and the front portion of the outer end in the vehicle width direction of the outflow portion 46.

As illustrated in FIG. 9, the cowl center 40 described above has a bottom wall 40f extending in the longitudinal direction thereof and a rear wall 40g including this bottom wall 40f and rising upward from the entire width in the vehicle width direction of the cowl center 40, and a side wall 40h is provided between the front portion of the outer end in the vehicle width direction of the recess portion 43 described above and the outer end in the vehicle width direction of the rear wall 40g.

In addition, a weir portion 40i extending in the vehicle front-rear direction is provided between the inner side in the vehicle width direction of the recess portion 44 and the inner side in the vehicle width direction of the rear wall 40g.

As illustrated in FIG. 9, an inclined wall 40k extending downward toward the outer side in the vehicle width direction is formed via a ridge line 40j on the outer side in the vehicle width direction of the bottom wall 40f described above.

In addition, an inclined wall 40n extending downward toward the inner side in the vehicle width direction is formed via a ridge line 40m on the inner side in the vehicle width direction of the bottom wall 40f described above.

Furthermore, a middle partition wall 40p, parallel to the partition wall 40d, that rises upward is provided in the middle in the front-rear direction of the inclined wall 40k.

Then, the walls 40a, 40c, 40d, 40e, 40f, 40g, 40k, 40n, and 40p described above form a flow path portion 47 through which the water drops having dripped on the cowl center 40 flow to both the inner and outer sides in the vehicle width direction.

This flow path portion 47 includes an uppermost portion 48 that is set to be the highest at the position X at which the wiper motor 16 is provided in the vehicle width direction and inclined portions 49L and 49R that are adjacent to the uppermost portion 48 in the vehicle width direction via the ridge lines 40j and 40m and extend downward toward the outer side and the inner side in the vehicle width direction.

The uppermost portion 48 described above is formed to have a concave path cross-section by the walls 40a, 40f, and 40g, one inclined portion 49L is formed to have a concave path cross-section by the walls 40d, 40k, and 40p, and the other inclined portion 49R is formed to have a concave path cross-section by the walls 40c, 40e, and 40n.

The inclined portion 49L extending downward toward the outer side in the vehicle width direction communicates with one outflow portion 45, and the inclined portion 49R extending downward toward the inner side in the vehicle width direction communicates with the other outflow portion 46.

As described above, the flow path portion 47 has the uppermost portion 48 that is the highest at the position X at which the wiper motor 16 is provided and the inclined portions 49L and 49R, adjacent to the uppermost portion 48 in the vehicle width direction, that extend downward toward the outer side in the vehicle width direction and the inner side in the vehicle width direction.

Furthermore, as illustrated in FIG. 5, the wiper motor 16 is located between the pair of wiper pivots WP1 and WP2 and the wiper pivots WP1 and WP2 have catch pans 50 and 51 as pivot drain paths that drain, downward, the water drops dripping from the inclined portions 49L and 49R of the flow path portion 47 described above.

The catch pans 50 and 51 form part of the drain route.

The cowl center 41 located on the right side in the vehicle width direction is configured as illustrated in FIGS. 7 to 9 and FIGS. 11 and 13.

That is, the cowl center 41 includes a bottom wall 41a extending in the vehicle width direction, a front wall 41b rising upward from the front portion of the bottom wall 41a, a rear wall 41c extending backward and upward from the rear portion of the bottom wall 41a, an inner wall 41d rising upward from the front portion of the inner end in the vehicle width direction of the bottom wall 41a, and an outer wall 41e rising upward from the outer end in the vehicle width direction of the bottom wall 41a.

A drain portion 41f that drains water to the drain member 60 is formed at the inner end portion in the vehicle width direction of the cowl center 41, that is, at a position away from the air inlet 3b of the dash lower panel 3 toward the inner side in the vehicle width direction (see FIGS. 8 and 9). This drain portion 41f is formed in an inclined shape that lowers downward toward the inner side in the vehicle width direction.

In addition, as illustrated in FIG. 13, an opening 41h for drainage is formed between the inner wall 41d described above and a notch portion 41g of the bottom wall 41a.

Furthermore, the drain portion 41f described above is provided in the middle portion in the vehicle width direction or in the vehicle left portion (right side in the drawing) as the other end side of the middle portion in the vehicle width direction as illustrated in FIGS. 8 and 9 so as to ensure the distance in the vehicle width direction between the air inlet 3b of the dash lower panel 3 and the drain portion 41f.

In contrast, the drain member 60 described above extends in the vehicle width direction as illustrated in FIGS. 8 and 9, and this drain member 60 has a top deck portion 61 located thereon at the position at which this drain member 60 overlaps with the outside air introduction hole 25 in vehicle plan view as illustrated in these drawings. This top deck portion 61 is formed over a predetermined range in the vehicle width direction indicated by an arrow a in FIGS. 8 and 9.

On the longitudinal side of the drain member 60 described above, that is, on both the left and right sides of the top deck portion 61 described above of the drain member 60, there are formed inclined portions 62 and 63 that are inclined downward toward the outer side in the vehicle width direction.

As illustrated in FIG. 8, the drain portion 41f described above of the cowl center 41 on the vehicle right side is provided at substantially the same position in the vehicle width direction as the top deck section 61 of the drain member 60.

Accordingly, the drain portion 41f of the cowl center 41 is vertically close to the top deck portion 61 of the drain member 60 and water is drained from the drain portion 41f of the cowl center 41 to the top deck portion 61 of the drain member 60 that is vertically close to the drain portion 41f of the cowl center 41, so droplets are not easily generated.

In addition, since the drain portion 41f of the cowl center 41 is away from the air inlet 3b of the dash lower panel 3 in the vehicle width direction, even if droplets are generated, the droplets are prevented from being entrained in the air flowing in the closed cross-section 26.

Furthermore, the drain portion 41f of the cowl center 41 and the top deck portion 61 of the drain member 60 are present at positions at which these portions overlap with the outside air introduction hole 25 in vehicle plan view, the pressure in the closed cross-section 26 in the formation region of the outside air introduction hole 25 is the same as that of the outside air, and the flow rate of air is the slowest in the closed cross-section 26. Since water is drained to the top deck portion 61 where the pressure is the same as that of the outdoor air and the flow rate of air is low as described above, even if droplets are generated, the droplets can be further prevented from being entrained in an air flow in the closed cross-section 26.

Furthermore, as illustrated in FIGS. 8 and 9, since the inclined portion 63 of the drain member 60 is inclined downward toward the outer side and the upper surface of this inclined portion 63 is located downward toward the air inlet 3b of the dash lower panel 3, the entrainment of droplets is further suppressed.

The cross-sectional structure of the top deck portion 61 of the drain member 60 described above is configured as illustrated in FIGS. 6 and 7.

That is, an intermediate flange 61c is coupled to the rear end of a front flange 61a via a vertical wall 61b, a bottom wall 61e is coupled to the rear portion of this intermediate flange 61c via a concave wall portion 61d, and a rear wall 61f rising upward is integrally coupled to the rear portion of the bottom wall 61e.

In addition, a partition wall 61g rising upward is integrally formed at the boundary portion between the concave wall portion 61d and the bottom wall 61e, and a flow path portion 64 extending in the vehicle width direction is formed between this partition wall 61g and the front portion of the bottom wall 61e.

As illustrated in FIG. 12, the inclined portion 63 described above has a flow path portion 65, close to the inclined portion 63, that communicates with the flow path portion 64 formed by a bottom wall 63a, a rear wall 63b rising upward from the rear portion of the bottom wall 63a, a wall portion 63c, formed in the front of the bottom wall 63a, that is continuous with the concave wall portion 61d of the top deck portion 61.

As illustrated in FIG. 12, the drain member 60 described above has a drain duct 66 in the end portion on the outer side in the vehicle width direction of the inclined portion 63.

That is, the drain duct 66 described above is configured by surrounding the downstream portion 65a of the flow path portion 65 described above by an extension portion 63d of the rear wall 63b described above, a side wall 63e, and a front wall 63f and forming a flow down hole 63g between the downstream portion 65a and the elements 63d, 63e, and 63f described above.

The generation of droplets is further suppressed reliably by the ensured flow path (see the flow down hole 63g) using the drain duct 66 described above.

As illustrated in FIGS. 6 and 7, the bottom wall 61e of the drain member 60 that corresponds to the drain portion 41f of the cowl center 41 described above is provided with a slope-shaped portion 67 inclined from the vehicle rear portion toward the vehicle front portion in a curved manner. This causes the water dripping from the drain portion 41f of the cowl center 41, which is the gutter member, onto the slope-shaped portion 67 of the drain member 60 to flow from the rear portion to the front portion along the slope-shaped portion 67 and reach the flow path portion 64.

As illustrated in FIGS. 6, 7, and 12, on the slope-shaped portion 67 described above, a plurality of ribs 71, 72, and 73 that rise upward from the slope-shaped portion 67 and extend in the front-rear direction of the vehicle are spaced apart from each other in the vehicle width direction. The plurality of ribs 71, 72, and 73 can weaken the momentum of the air flowing in the closed cross-section 26, thereby further increasing the effect of suppressing the entrainment of droplets.

Although the structure of the ribs 71, 72, and 73 on the vehicle right side has been described with reference to FIGS. 6, 7, and 12, a plurality of ribs symmetrical to the ribs 71, 72, and 73 on the vehicle right side are provided on the vehicle left side as well, as illustrated in FIGS. 4 and 5.

By the way, as illustrated in FIGS. 8 and 9, the fuse box storage case 28 as one of the auxiliaries and an auxiliary placement space 34 that stores the battery 31 are enclosed by the cover member 33 (see FIG. 1), the rear side panel 8b, a wheel house 35 and an insulator 36.

The wheel house 35 described above is connected between the rear side panel 8b and a front side frame outer 6b. In addition, the insulator 36 described above is connected between the lower surface of the inclined lower end portion of the inclined portion 63 of the drain member 60 and the front side frame inner 6a.

The water dripping from the front windshield 4 flows as described below.

That is, the water dripping along the front windshield 4 is once caught by the cowl center 41 illustrated in FIG. 7. The water dripping onto the cowl center 41 flows down to the top deck portion 61 of the drain member 60 illustrated in FIG. 8 from the drain portion 41f at a position away from the air inlet 3b of the dash lower panel 3 in the vehicle width direction.

The water having flowed down to the top deck portion 61 reaches the flow path portion 64 (see FIG. 7) along the slope-shaped portion 67, flows through the drain duct 66 via the flow path portion 65 of the inclined portion 63 illustrated in FIG. 12 from the flow path portion 64, and is discharged downward.

As illustrated in FIG. 8, since the vertical dimension between the drain portion 41f of the cowl center 41 and the top deck portion 61 of the drain member 60 is small, droplets are not easily generated. In addition to this, since the drain portion 41f of the cowl center 41 is away from the air inlet 3b of the dash lower panel 3 in the vehicle width direction, even if droplets are generated, the droplets can be prevented from being entrained in the air flowing in the closed cross-section 26 (see FIG. 7).

It should be noted that, in the drawing, arrow F indicates the vehicle front, arrow R indicates the vehicle rear, arrow IN indicates the inner side in the vehicle width direction, arrow OUT indicates the outer side in the vehicle width direction, and arrow UP indicates the vehicle upper side.

As described above, the front structure of a vehicle according to the example described above includes: the dash panel (dash lower panel 3) that extends in the vehicle width direction and performs partitioning into the engine compartment 1 and the vehicle interior 2 in the vehicle front-rear direction; the air inlet 3b provided on one end side in the vehicle width direction of the dash panel (dash lower panel 3); the cowl grille 24 that has the outside air introduction hole 25 at the position away from the air inlet 3b toward the end side in the vehicle width direction; the drain member 60 provided below the cowl grille 24, the drain member 60 forming the closed cross-section 26 extending in the vehicle width direction in cooperation with the cowl grille 24; and the gutter member (cowl center 41) provided in the closed cross-section 26 above the drain member 60, the gutter member receiving the water dripping from the front windshield 4, in which the gutter member (cowl center 41) has the drain portion 41f that drains the water to the drain member 60, the drain member 60 has the top deck portion 61 thereon at the position at which the drain member 60 overlaps with the outside air introduction hole 25 in plan view, and the drain portion 41f is provided at substantially the same position as the top deck portion 61 in the vehicle width direction (see FIGS. 1, 7, and 8).

According to this structure, the drain portion 41f of the gutter member (cowl center 41) is vertically close to the top deck portion 61 of the drain member 60 and water is drained to the top deck portion 61 of the drain member 60 that is vertically close to the drain portion 41f of the gutter member (cowl center 41), so droplets are not easily generated.

In addition, since the drain portion 41f of the gutter member (cowl center 41) is away from the air inlet 3b of the dash panel (dash lower panel 3) in the vehicle width direction, even if droplets are generated, the droplets can be prevented from being entrained in the air flowing in the closed cross-section 26.

Furthermore, the drain portion 41f of the gutter member (cowl center 41) and the top deck portion 61 of the drain member 60 are present at positions at which these portions overlap with the outside air introduction hole 25 in vehicle plan view, the pressure in the closed cross-section 26 in the formation region of the outside air introduction hole 25 is the same as that of the outside air, and the flow rate of air is the slowest in the closed cross-section 26. Since the water is drained to the top deck portion 61 where the pressure is the same as that of the outdoor air and the flow rate of air is low as described above, even if droplets are generated, the droplets can be further prevented from being entrained in an air flow in the closed cross-section 26.

In short, the structure described above can suppress the generation of droplets of the water dripping from the gutter member (cowl center 41) and, even if droplets are generated, can suppress the movement of the droplets along with an air flow in the closed cross-section 26.

In addition, according to an embodiment of the present disclosure, the drain portion 41f of the gutter member (cowl center 41) is provided in a middle portion in the vehicle width direction or a portion on the other end side (left side in the vehicle width direction in this example) of the middle portion in the vehicle width direction (FIG. 8).

According to this structure, since the distance in the vehicle width direction between the air inlet 3b of the dash panel (dash lower panel 3) and the drain portion 41f can be ensured, even if droplets are generated, the droplets can be prevented from being entrained in an air flow in the closed cross-section 26.

In addition, according to an embodiment of the present disclosure, the drain member 60 extends in the vehicle width direction and has the inclined portion 63 inclined downward toward an outer side in the vehicle width direction on the longitudinal side of the drain member 60 (see FIGS. 8 and 9).

According to this structure, since the inclined portion 63 of the drain member 60 is inclined downward toward the outer side and the drain route on the upper surface of this inclined portion 63 is located downward toward the air inlet 3b of the dash panel (dash lower panel 3), the entrainment of droplets can be further suppressed.

In addition, according to an embodiment of the present disclosure, the drain member 60 has a drain duct 66 in an end portion on the outer side in the vehicle width direction of the inclined portion 63 (see FIGS. 11 and 12).

According to this structure, since the flow path can be ensured by the drain duct 66 described above, the generation of droplets can be reliably suppressed.

In addition, according to an embodiment of the present disclosure, the outside air introduction hole 25 is formed in the middle portion in the vehicle width direction of the cowl grille 24 or a portion on the other end side in the vehicle width direction of the middle portion in the vehicle width direction (see FIGS. 8 and 9).

According to this structure, the distance in the vehicle width direction between the air inlet 3b of the dash panel (dash lower panel 3) and the outside air introduction hole 25 of the cowl grille 24 is securely ensured and the entrainment of droplets is effectively suppressed.

In addition, according to an embodiment of the present disclosure, the drain member 60 corresponding to the drain portion 41f of the gutter member (cowl center 41) is provided with the slope-shaped portion 67 inclined from the rear portion to the front portion (see FIGS. 6 and 7).

According to this structure, the water dripping from the drain portion 41f of the gutter member (cowl center 41) to the slope-shaped portion 67 of the drain member 60 flows down from the rear portion to the front portion along the slope-shaped portion 67.

In addition, according to an embodiment of the present disclosure, the plurality of ribs 71, 72, and 73 extending in the vehicle front-rear direction are spaced apart from each other in the vehicle width direction in the slope-shaped portion 67 (see FIG. 12).

According to this structure, the plurality of ribs 71, 72, and 73 can weaken the momentum of the air flowing in the closed cross-section 26, thereby increasing the effect of suppressing the entrainment of droplets.

In the correspondence between the structure of the present disclosure and the example described above, the dash panel according to the present disclosure corresponds to the dash lower panel 3 according to the example, similarly, the gutter member corresponds to the cowl center 41, but the present disclosure is not limited to the structure of the example described above and may be practiced in many other embodiments.

INDUSTRIAL APPLICABILITY

As described above, the present disclosure is useful for the front structure of a vehicle that includes a dash panel that extends in the vehicle width direction and performs partitioning into an engine compartment and a vehicle interior in the vehicle front-rear direction, an air inlet provided on one end side in the vehicle width direction of the dash panel, and a cowl grille that has an outside air introduction hole at a position away from the air inlet toward the other end side in the vehicle width direction.

DESCRIPTION OF REFERENCE SIGNS AND NUMERALS

1: engine compartment
2: vehicle interior
3: dash lower panel (dash panel)
3b: air inlet
4: front windshield
24: cowl grille
25: outside air introduction hole
26: closed cross-section
41: cowl center (gutter member)
41f: drain portion
60: drain member
61: top deck portion
63: inclined portion
66: drain duct
67: slope-shaped portion
71, 72, 73: rib

The invention claimed is:

1. A front structure of a vehicle, comprising:
a dash panel that extends in a vehicle width direction and performs partitioning into an engine compartment and a vehicle interior in a vehicle front-rear direction;
an air inlet provided on one end side in the vehicle width direction of the dash panel;
a cowl grille that has an outside air introduction hole at a position away from the air inlet toward another end side in the vehicle width direction;
a drain provided below the cowl grille, the drain forming a closed cross-section extending in the vehicle width direction in cooperation with the cowl grille; and
a gutter provided in the closed cross-section above the drain, the gutter receiving water dripping from a front windshield,
wherein the gutter has a drain portion that drains the water to the drain,
the drain has a top deck portion thereon at a position at which the drain overlaps with the outside air introduction hole in plan view, and
the drain portion is provided at substantially the same position as the top deck portion in the vehicle width direction.

2. The front structure of a vehicle according to claim 1, wherein the drain portion of the gutter is provided in a middle portion in the vehicle width direction or a portion on the other end side in the vehicle width direction of the middle portion in the vehicle width direction.

3. The front structure of a vehicle according to claim 2, wherein the drain extends in the vehicle width direction and has an inclined portion inclined downward toward an outer side in the vehicle width direction on a longitudinal side of the drain member.

4. The front structure of a vehicle according to claim 3, wherein the drain has a drain duct in an end portion on an outer side in the vehicle width direction of the inclined portion.

5. The front structure of a vehicle according to claim 4, wherein the outside air introduction hole is formed in a middle portion in the vehicle width direction of the cowl grille or a portion on the other end side in the vehicle width direction of the middle portion in the vehicle width direction.

6. The front structure of a vehicle according to claim 5, wherein the drain corresponding to the drain portion of the gutter is provided with a slope-shaped portion inclined from a rear portion to a front portion.

7. The front structure of a vehicle according to claim 6, wherein a plurality of ribs extending in the vehicle front-rear direction are spaced apart from each other in the vehicle width direction in the slope-shaped portion.

8. The front structure of a vehicle according to claim 1, wherein the drain extends in the vehicle width direction and has an inclined portion inclined downward toward an outer side in the vehicle width direction on a longitudinal side of the drain member.

9. The front structure of a vehicle according to claim 1, wherein the outside air introduction hole is formed in a middle portion in the vehicle width direction of the cowl grille or a portion on the other end side in the vehicle width direction of the middle portion in the vehicle width direction.

10. The front structure of a vehicle according to claim 1, wherein the drain corresponding to the drain portion of the gutter is provided with a slope-shaped portion inclined from a rear portion to a front portion.

11. The front structure of a vehicle according to claim 10, wherein a plurality of ribs extending in the vehicle front-rear direction are spaced apart from each other in the vehicle width direction in the slope-shaped portion.

* * * * *